Patented Dec. 19, 1950

2,534,395

UNITED STATES PATENT OFFICE 2,534,395

SYNTHESIS OF HYDROCARBONS

Harold V. Atwell, Beacon, N. Y., assignor to The Texas Company, New York, N. Y., a corporation of Delaware No Drawing. Application June 12, 1948, Serial No. 32,731

8 Claims. (Cl. 260—449.6)

1

The present invention relates to the synthesis of hydrocarbons, oxygenated hydrocarbons and mixtures thereof, boiling in the motor gasoline range, by the catalytic reduction of carbon oxides with hydrogen, and is more particularly concerned with restricting the production of undesired normally gaseous olefins in such a manner as to supplement the yield of desired liquid products.

In accordance with the present invention, synthesis is effected by passing synthesis gas in contact with a typical hydrocarbon synthesis catalyst in the presence of, or in close proximity to, a second catalyst effective to polymerize gaseous olefins to motor gasoline hydrocarbons but free from any substantial cracking activity under the reaction conditions employed. In short, contact between the reactants and the two catalysts is carried out in a common reaction zone so that the reactants are simultaneously subjected to the effects of hydrocarbon synthesis and olefin polymerization substantially free from any hydrocarbon cracking effect.

The invention has particular application to the hydrocarbon synthesis process employing an iron catalyst; that is to say, a catalyst wherein iron, whether in the form of metal, oxide, carbide or combinations thereof is the essential catalytic medium by which the hydrogen is caused to reduce the carbon monoxide with the formation of hydrocarbons. The primary applicability to synthesis processes employing iron catalyst is believed to follow from the fact that hydrocarbons other than methane, produced by such catalysts are predominantly or essentially in the form of olefins. The gaseous olefins, to the extent that they cannot be absorbed in the final motor gasoline, represent undesired by-products which correspondingly decrease the yield of liquid hydrocarbons. The present invention accordingly contemplates the selective control of the synthesis process so as to suppress this yield of undesired gaseous olefins and correspondingly supplement the yield of desired liquid hydrocarbons. This effect is achieved without objectionable increase in production of undesired heavy hydrocarbons. It thus has the important advantage of directing the reaction toward the maximum yield of products within the motor gasoline boiling range under reaction conditions favorable to long catalyst life.

It has the further advantage of increasing the production of polymeric olefins of improved anti-detonation characteristics. Moreover, it permits attainment of these results in apparatus of more or less conventional type and under physical reaction conditions usually typical of hydrocarbon synthesis with an iron catalyst.

In accordance with the present invention, the two catalysts, namely, the synthesis catalyst and the polymerizing catalyst, preferably occupy the reaction zone in the form of a mixture of discrete catalytic particles. The contact mass may take the form of a fixed or movable bed. Most advantageously, however, the process is carried out with the two catalysts uniformly fluidized by the upflowing reactants in a state of good admixture. To this end, the respective catalysts are solid particles of comparable or approximately equivalent settling rates, since where the respective settling rates vary materially, segregation and stratification of the two catalysts may tend to occur.

As is known, settling rate is usually a function of catalyst density, particle size, and particle shape; and, in view of the several variables, is best determined by actual experiment.

On the other hand, otherwise objectionable variation in respective settling rates may be overcome by special precautions such as mechanical mixing of the contact mass or continual circulation of the more easily fluidized constituent from the top to the bottom of the reactor by any appropriate mechanical means.

One method of effecting such admixture is disclosed in my copending application, Serial #533,901, filed May 3, 1943, now Patent No. 2,443,673, wherein one relatively coarse catalyst is confined within a reaction zone while a suspension of the other catalyst in the reactant stream passes upwardly therethrough, preferably as a dilute fluid phase, and is continuously removed and recycled to the lower portion of the reaction zone.

The hydrocarbon synthesis catalyst, as intimated above, is preferably selected from the group of iron synthesis catalysts, which characteristically results in the production of predominantly olefinic products. It may comprise an iron salt or oxide deposited on a suitable carrier, such as silica gel, kieselguhr, and the like, and thereafter reduced with hydrogen at elevated temperature and activated by conversion to carbide by treatment with synthesis gas, under suitable conditions. However, it is preferred to employ unsupported iron catalysts produced, for example, by reducing an iron oxide and conditioning in the usual manner. It is contemplated that the catalyst include the usual promoters and activators such as the alkali and alkaline earth metal oxides, alumina, titania, and others, usually in minor proportion of not more than one or two per cent.

The polymerization catalyst employed herein, which is effective to convert gaseous olefins to motor gasoline, without causing any substantial cracking, is particularly exemplified by the phosphoric acid type catalyst which includes those contact materials depending for their polymerizing effect upon the presence of phosphoric or pyrophosphoric acids or their radicals. Such, for example, are the copper pyrophosphate or so-called solid phosphoric acid catalysts usually comprising essentially $P_2O_5$ deposited upon a carrier such as kieselguhr, fuller's earth, bentonite or the like.

Temperatures of reaction especially contemplated are those within the range of 550 to 700° F., particularly about 600 to 650° F., and provision is preferably made for operating under superatmospheric pressure, usually above 50 to 100 pounds per square inch, as, for example 200 to 400 p. s. i. g.

The desired level of operating temperature under the conditions of continued exothermic liberation of heat involved may be maintained by cooling means effective to controlledly abstract the heat energy. For example, the reaction zone may be provided with cooling surfaces in the form of an exchanger in contact with the catalyst and carrying an internal flow of suitable coolant such as Dowtherm or water under pressure.

It is of particular importance to note that under these conditions the composite catalyst effects an improved conversion of the synthesis feed gas, which comprises a mixture of carbon monoxide and hydrogen, into desired liquid products, in spite of the high concentration of water vapor resulting from the primary synthesis of hydrocarbons.

The advantages of the present invention are available even though the relative proportioning of the respective catalysts in the composite mixture varies within wide limits. For example, substantial suppression of light gaseous olefin production is experienced where the polymerization catalyst comprises only about 10% of the mixture and may comprise as much as 90% where an active synthesis catalyst is employed. Advantageously, however, the synthesis catalyst is present in major proportion, usually from 2 to 3 times the volume of the polymerization catalyst.

In accordance with one specific example, presented, not by way of limitation but in order to facilitate understanding of the invention, a reaction vessel is provided with a mass of particles comprising a mixture of iron catalyst and the so-called solid phosphoric acid catalyst.

The iron catalyst comprises essentially metallic iron of particles size 200 mesh and finer, about 50% passing a 325 mesh screen, produced by reduction of iron oxide with hydrogen at elevated temperature and thereafter conditioned by passage of synthesis gas at a temperature of about 600° F.

The reduced iron catalyst includes about 0.5% of potassia ($K_2O$) and about 2.0 of alumina ($Al_2O_3$).

The solid phosphoric acid catalyst admixed therewith is formed by depositing about 18 parts of 90% phosphoric acid on about 70 parts of kieselguhr, calcining at about 300° C. for about 40 hours, and grading to a particle size corresponding to that of the iron catalyst. About two parts of iron catalyst are present per each part of the solid phosphoric acid catalyst on the basis of settled volume.

Synthesis gas comprising about 64 mol per cent of hydrogen, 32 mol per cent of carbon monoxide and the remainder small proportions of methane, carbon dioxide and nitrogen, is passed upwardly through the catalyst at a pressure of about 250 pounds per square inch and a temperature of about 625° F. The effluent products withdrawn from the upper surface of the catalyst are condensed at about 100° F.; the liquid water and hydrocarbon layers separated; and the normally gaseous products recycled into admixture with the fresh feed synthesis gas at a ratio of about two standard volumes of recycled gas to one of the synthesis gas.

Linear upflow of the total gases passing through the reaction vessel is maintained at a rate of about 1.5 feet per second in the reaction zone, suitable to hold the solid catalyst particles in a highly agitated dense phase condition, in which uniform admixture of the two catalysts prevails. Contact time between the reactants and the catalyst is approximately 10 seconds.

Under the foregoing conditions, the yield of liquid hydrocarbons boiling in the motor gasoline range amounts to about 130 grams per cubic meter of carbon monoxide and hydrogen supplied in the fresh feed synthesis gas, whereas the yield of additional propylene and butylene is approximately 10 grams per cubic meter.

Contrasted with an example otherwise identical but carried out in the presence of the iron catalyst alone, that is, in the absence of the solid phosphoric acid catalyst, the yield of liquid hydrocarbons is substantially decreased and the production of undesired gaseous olefins is materially larger. For example, under such conditions, the yield of liquid in the gasoline range would be about 100 grams per cubic meter of fresh feed and the additional yield of propylene and butylene would be about 40 grams per meter. In addition, the catalyst of the second example, after comparable periods of operation, includes noticeably increased deposits of heavy and waxy hydrocarbons.

While the foregoing invention has been particularly described in terms of use of a solid, particulate contact mass, the invention is not, in its broadest aspect, limited to the specific physical form of either catalyst in so far as active synthesis and polymerization catalysts are associated in the same reaction zone, preferably so as to simultaneously contact the reactants as a composite mass.

The invention particularly contemplates use of a fresh feed stream of reactants comprising hydrogen and carbon monoxide in the molar ratio of about 2:1, although broadly it may be carried out with any typical synthesis gas comprising hydrogen and carbon monoxide. Small amounts of water vapor may be beneficially added to the feed gas when the conversion of synthesis gas to hydrocarbons is low, or when the course of synthesis gives a high yield of $CO_2$ relative to $H_2O$. On the other hand, with good conversion and using an iron catalyst under conditions such as above where by-product water vapor is formed to the substantial exclusion of by-product carbon dioxide, any substantial addition of water vapor with the fresh feed is detrimental to the phosphoric acid catalyst.

It is also advantageous to provide, as in the foregoing example, for recycle of a substantial portion of the normally gaseous products of reaction to the reaction zone. Thus, when product gases, remaining after condensation and separation of the normally liquid products of reaction, are admixed with the fresh feed reactants supplied to the reaction zone, there is usually an increased consumption of reactants, with better suppression of light olefinic gases and correspondingly improved yield of desired liquid hydrocarbons and oxygenated hydrocarbons. Likewise, where the molar ratio of hydrogen to carbon monoxide in the fresh feed synthesis gas is above about 1:1 and preferably above 2:1, the net production of by-product carbon dioxide is usually inconsequential. Usually, recycle rates of about 0.5 to 3.0 times the rate of introduction of the fresh feed gas are suitable.

In thus recycling, however, it is desirable to remove the desired products of reaction as well as by-product water vapor under conditions such that light gaseous olefins are included in the recycle stream. This may be effected by condensation and separation at an appropriate temperature and pressure or may be carried out by more detailed fractionation of the product stream. For example, condensation and separation may be carried out at 70 to 100° F. and a pressure of about 200 pounds per square inch, the separated liquid oil layer subjected to stabilization and thus recovered gaseous hydrocarbon streams recycled to the reactor.

Obviously, many modifications and variations of the invention as set forth above may be made without departing from the spirit and scope thereof and therefore only such limitations should be imposed as are indicated in the appended claims.

What I claim is:

1. In the catalytic synthesis of normally liquid fractions of hydrocarbons, oxygenated hydrocarbons and mixtures thereof, by the reduction of carbon monoxide with hydrogen in the presence of an iron, hydrocarbon synthesis catalyst under reaction conditions including an elevated pressure above 50 pounds per square inch and a reaction temperature in the range of about 550–700° F. such that the reactants are converted into predominantly olefinic reaction products, the improvement which comprises suppressing the yield of normally gaseous olefins and increasing the yield of said desired liquid products by effecting contact between said reactants and said synthesis catalyst in a reaction zone under said reaction conditions while in the presence of a second catalyst substantially free from any hydrocarbon cracking activity and comprising a phosphoric acid type, polymerization catalyst, effecting the synthesis of said desired products under conditions such that the non-hydrocarbon by-product consists predominantly of water vapor with a low net production of carbon dioxide, withdrawing the effluent products from contact with the catalyst in the reaction zone, and recovering liquid fractions therefrom.

2. In the catalytic synthesis of normally liquid hydrocarbons, oxygenated hydrocarbons and mixtures thereof, by the reduction of carbon monoxide with hydrogen in the presence of an iron, hydrocarbon synthesis catalyst under reaction conditions including a pressure substantially above atmospheric and an elevated temperature of about 550–700° F., such that the reactants are converted into predominantly olefinic reaction products, the improvement which comprises suppressing the yield of normally gaseous olefins and increasing the yield of desired liquid products by effecting said contact between the reactants and said synthesis catalyst in the presence of a phosphoric acid type polymerization catalyst of the class consisting of solid phosphoric acid and copper pyrophosphate, effecting the synthesis of said desired products under conditions such that the non-hydrocarbon by-product thereof consists predominantly of water vapor with a low net production of carbon dioxide, withdrawing the effluent products from contact with the catalyst and recovering liquid fractions therefrom.

3. The method according to claim 2, wherein said polymerization catalyst is in the form of discrete particles maintained in intimate admixture with the hydrocarbon synthesis catalyst.

4. The method according to claim 2, wherein said hydrocarbon synthesis catalyst and said polymerization catalyst are, respectively, in the form of a mixture of discrete particles maintained in a fluidized condition within the reaction zone.

5. The method according to claim 4, wherein the two catalysts have essentially equivalent settling rates.

6. The method according to claim 2, wherein the reaction pressure is above about 50 pounds per square inch.

7. The method according to claim 2, wherein the operating temperature is in the range from about 600–660° F.

8. The method according to claim 2, wherein the normally gaseous olefins are continually recycled into contact with said catalyst in the reaction zone.

HAROLD V. ATWELL.

REFERENCES CITED

The following references are of record in the file of this patent:

UNITED STATES PATENTS

| Number | Name | Date |
|---|---|---|
| 1,798,288 | Wietzel | Mar. 31, 1931 |
| 2,181,640 | Deanesly et al. | Nov. 28, 1939 |
| 2,254,806 | Michael | Sept. 2, 1941 |
| 2,284,468 | Burk et al. | May 26, 1942 |
| 2,365,029 | Voorhies, Jr. | Dec. 12, 1944 |
| 2,389,780 | Ipatieff et al. | Nov. 27, 1945 |
| 2,397,301 | Vesterdal | Mar. 26, 1945 |
| 2,404,788 | Burk et al. | July 30, 1946 |
| 2,406,864 | Thomas | Sept. 3, 1946 |
| 2,443,673 | Atwell | June 22, 1948 |
| 2,471,129 | Vesterdal | May 24, 1949 |